A. PIAT.
SMELTING FURNACE.
No. 11,379. Reissued Nov. 7, 1893.
Fig. 9
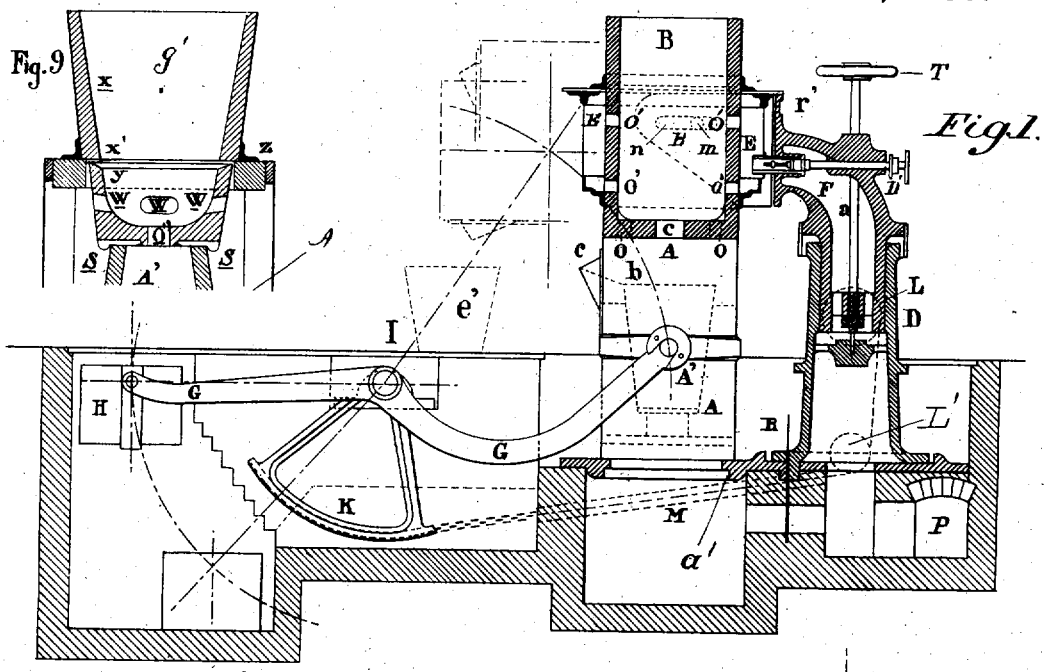
Fig. 5
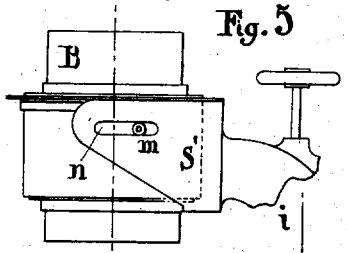
Fig. 2.
Fig. 6
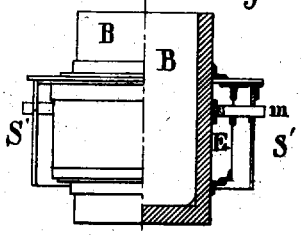
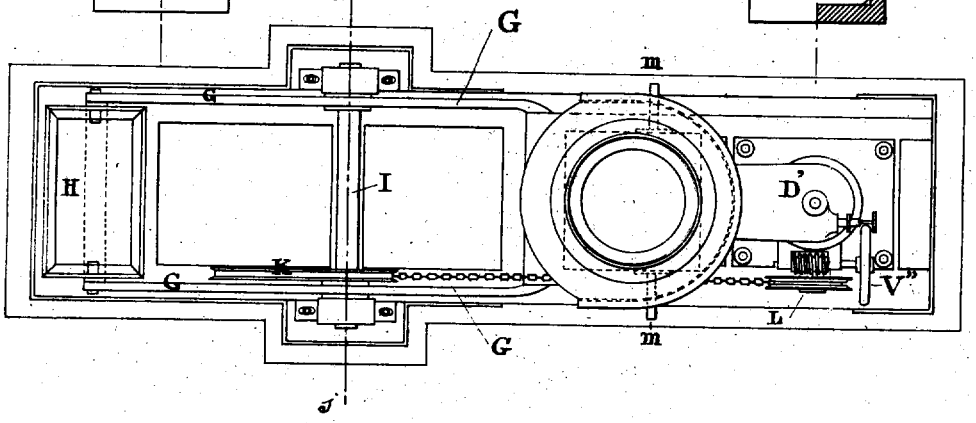
WITNESSES:
Edward F. Ayres.
INVENTOR
Albert Piat
by his atty.
Francis T. Chambers 2 Sheets—Sheet 2.
A. PIAT.
SMELTING FURNACE.
No. 11,379. Reissued Nov. 7, 1893.
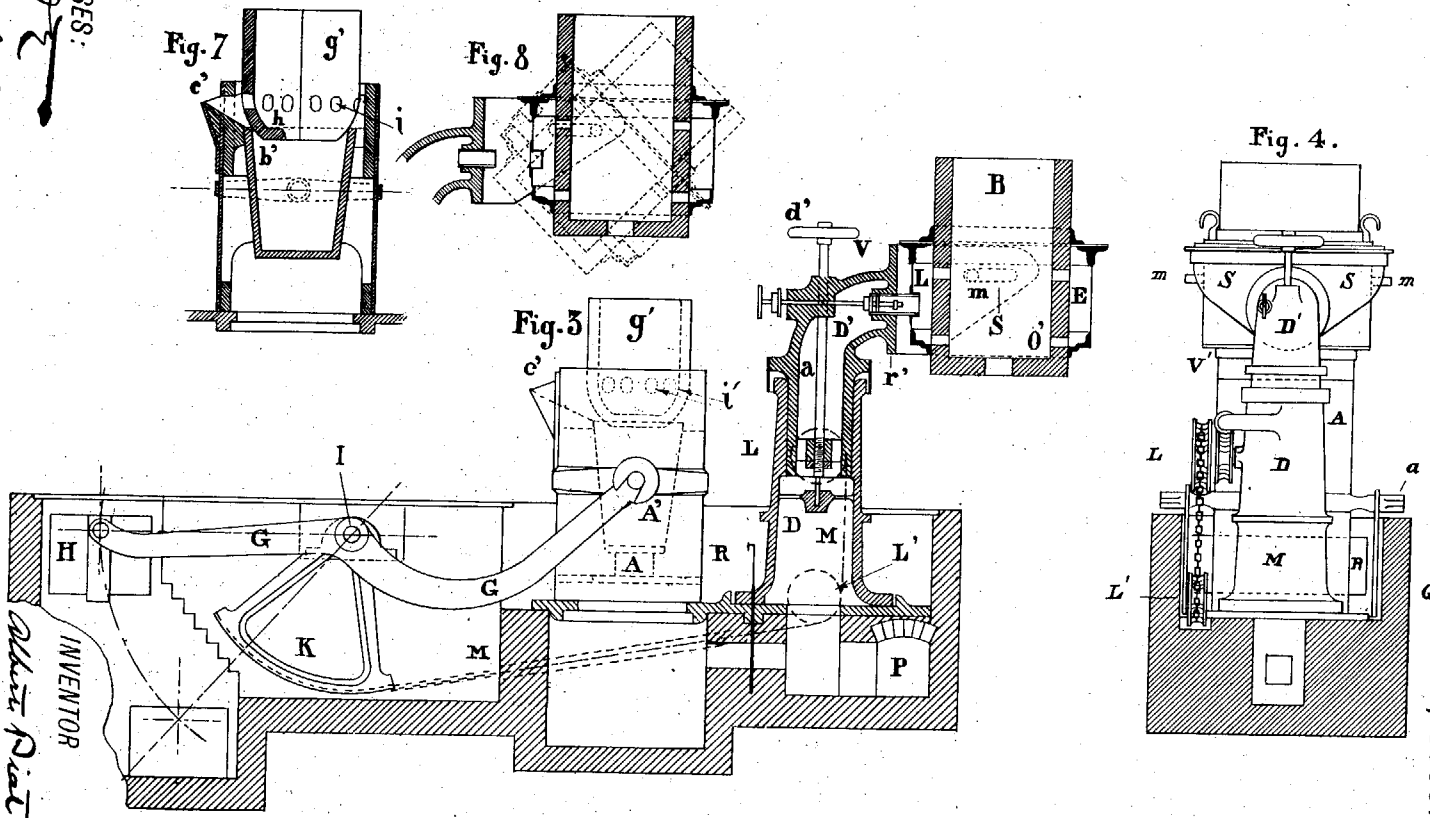
WITNESSES:
Edward F. Ayres
INVENTOR
Albert Piat
by his atty.
Francis T. Chamberlin

UNITED STATES PATENT OFFICE.

ALBERT PIAT, OF PARIS, FRANCE.

SMELTING-FURNACE.

SPECIFICATION forming part of Reissued Letters Patent No. 11,379, dated November 7, 1893.

Original No. 467,310, dated January 19, 1892. Application for reissue filed July 10, 1893. Serial No. 480,084. Patented in France May 27, 1889, No. 198,529; in Belgium October 23, 1889, No. 88,171; in Italy November 11, 1889, No. 26,391; in Spain November 19, 1889, No. 10,283, and in Luxemburg December 12, 1889, No. 1,221.

*To all whom it may concern:*

Be it known that I, ALBERT PIAT, of Paris, in the Republic of France, have invented a new and useful Smelting-Furnace, (for which I have received Letters Patent in France May 27, 1889, No. 198,529; in Belgium October 23, 1889, No. 88,171; in Spain November 19, 1889, No. 10,283; in Italy November 11, 1889, No. 26,391, and in Luxemburg December 12, 1889, No. 1,221,) which invention is fully set forth in the following specification.

The principal object of my invention is to provide a smelting furnace which shall be easy to handle and which will permit of the fusion of small charges of iron or steel; and it consists in certain parts and combinations thereof hereinafter more particularly described and claimed.

In order to make my invention more clearly understood, I have shown in the accompanying drawings a means for carrying the same into effect.

In said drawings, Figure 1 represents a section and elevation of the furnace. Fig. 2 is a plan view of the apparatus; Fig. 3, an elevation showing the cupola turned over and the raised body arranged on the crucible; Fig. 4, profile of the apparatus, seen from the rear; Fig. 5, elevation of the fire-box by the side of the apparatus; Fig. 6, semi-front elevation of the box and semi-vertical section; Fig. 7, section of the oscillating furnace and of the raised body which surrounds it; Fig. 8, view showing the working of the cupola; Fig. 9, view showing the crucible surmounted by its raised body.

A is the lower furnace, adapted to swing or oscillate and also to be moved from the grate *a* or flue beneath it by moving the frame in which its trunnions are journaled. It incloses in its interior a crucible A′, well supported and surrounded by combustibles, and whose contents can vary.

B is a small cupola proportioned to the size of the furnace A, with which it is combined and on which it rests. It is charged directly from the top, and the melted matter flows constantly as the fusions advance through an opening *c* formed in the middle of its bottom, and falls into the lower crucible A′.

A hollow drum D serves as support for cupola B and also as a duct for leading the blast through a hollow pivot D′ into the annular chamber E through valve V. The blast passes into the cupola through openings *o o′* and also into the furnace A through the grate *a′* beneath it. The pivot D′ can be loosened by means of a pivot screw *a*, worked from the outside by a hand wheel T, if it is desired, after the operation is terminated to lift up the cupola in order to turn it with the movable part of the column, and thereby uncover the furnace A which can then be raised and tilted.

To permit of moving the furnace A to a convenient height, allowing the interior crucible to pour into a ladle without a crane, the trunnions of this furnace are borne by the ends of the two levers G G, forming a crossed frame at its ends and fulcrumed on a shaft, as at I. The furnace is almost balanced by a counterweight H, suspended at the opposite ends of said levers. On this axle a sector K is wedged to which is fixed a chain M, which rolls around a small winch L, actuated by a handwheel V″ and an endless screw after having passed over a guide pulley L′. By acting on this chain the furnace is worked with the greatest facility.

The blast coming through the flue P is distributed either alternately or simultaneously to the two attached and superposed apparatus A and B by gate valve R to the furnace and by valve V to the cupola B. If, instead of melting metal which must be put into the cupola with coke and a flux, it is only desired to reheat some metal without combustion and without flux, then cupola B, with its own casing or annular chamber E serves itself as a crucible in which the metal to be reheated and melted is placed. The hot gases of the lower furnace A pass into the interior of said cupola-crucible, into the interior of which they penetrate by openings *o o*, duly opened, and by the lower middle opening *c*, by which the melted metal flows into lower crucible A′. Should the gases arising from furnace A not be entirely burned, a little air blown through valve V would complete their combustion in the cupola.

In the arrangement shown in Fig. 3 it is well seen that the cupola can work independently, while at the same time the furnace A can be utilized by means of a raised crucible $g'$, arranged as shown in section, Fig. 7. The upper or raised crucible is pierced at its bottom by a central hole $h'$ and lateral holes $i'$, by which the gases of the furnace penetrate into its interior, heating and melting the metal which flows off in the subjacent crucible A'; but as the bottom of such a crucible wears much I have thought of making it with a removable bottom, as shown by Fig. 9. The upper body proper $x$ is separated from the bowl $y$ and rests on the top $z$ of the furnace and has a large central hole. The body is of sheet iron, in the shape of a truncated cone, lined with refractory earth. The basin when reduced by use is easily replaced, is made of plumbago, and rests with four broad radial projections $s$ in the middle crucible A', of which the shape is somewhat different. The flames of the furnace penetrate into the basin, passing between the projections $s$, through the central hole $o''$ and the slightly sloping lateral holes.

So as to be capable of easily cleaning the cupola and that it can pour into a ladle when working independently two opposed trunnions $m$ $m$, supplied each with a roller, rolling grooves $n$ $n$, formed in brackets S' S', forming a part of the turning post D' of the column, are arranged at a convenient height. When the cupola is to be turned and emptied, it is pushed to the front, rolling to a point where its bottom can be lifted without touching the top of the movable part of column D.

Having now described my invention, what I claim as new, and desire to secure by Letters Patent, is—

1. The combination of a furnace A, a crucible A' arranged within the furnace and a superimposed crucible having a separate and removable bottom, independent of the lower crucible said upper crucible being adapted to deliver melted metal to crucible A' as specified.

2. The combination of a furnace, A, a crucible A' supported in said furnace, and an upper cupola or furnace arranged to deliver melted metal into crucible A' as described and having an annular air chamber and an independent pivoted support serving also as an air conduit substantially as and for the purpose specified.

3. The combination of a furnace A, a crucible A' supported in said furnace, and an upper cupola or furnace arranged to deliver melted metal into crucible A' as described and having an annular air chamber and an independent support pivoted to turn in a horizontal plane and also movable vertically, said support serving also as an air conduit, substantially as and for the purpose specified.

4. The combination of the furnace A having trunnions at its sides with counterbalanced lifting mechanism arranged to act on said furnace through its trunnions as described, a crucible A' secured in said furnace and a superimposed cupola or furnace arranged to deliver melted metal to crucible A'.

5. The combination of the furnace A having trunnions at its sides with counterbalanced lifting mechanism arranged to act on said furnace through its trunnions as described, a crucible A' secured in said furnace, a superimposed cupola or furnace arranged to deliver melted metal to crucible A' and a hollow pivoted column arranged to support the upper crucible and supply air to it as specified.

6. The combination of the furnace A pivoted upon an oscillating counterbalanced frame, the crucible within the furnace, the sector secured to the axle or shaft of the said frame, the chain connected with the sector for moving frame and furnace, the hollow pivot column D' connected with the blast flue, a cupola supported by trunnions which are mounted in slots formed in brackets of the said pivot column, and the wind chamber E surrounding the cupola, substantially as set forth.

ALBERT PIAT.

Witnesses:
ROBT. M. HOOPER,
CH. CASALONGA.